(12) United States Patent
Booher (10) Patent No.: US 6,174,023 B1
(45) Date of Patent: Jan. 16, 2001

(54) FLOOR REINFORCEMENT SYSTEM FOR TRAILER ASSEMBLY

(75) Inventor: Howard Booher, Atwater, OH (US)

(73) Assignee: East Manufacturing, Randolph, OH (US)

(*) Notice: Under 35 U.S.C. 154(b), the term of this patent shall be extended for 0 days.

(21) Appl. No.: 09/386,797

(22) Filed: Aug. 31, 1999

(51) Int. Cl.[7] .................................................. B62D 63/00
(52) U.S. Cl. ......................... 296/182; 296/183; 52/731.6
(58) Field of Search .................................... 296/182, 183, 296/181; 280/423.1; 52/731.6

(56) References Cited

U.S. PATENT DOCUMENTS

| | | | |
|---|---|---|---|
| 4,049,285 | * 9/1977 | Chieger | 296/182 X |
| 4,288,957 | * 9/1981 | Meehan | 296/182 X |
| 4,534,589 | 8/1985 | Booher . | |
| 4,564,233 | 1/1986 | Booher . | |
| 4,616,879 | 10/1986 | Booher . | |
| 5,401,050 | * 3/1995 | Baker | 296/182 X |
| 5,655,792 | 8/1997 | Booher . | |

* cited by examiner

Primary Examiner—Joseph D. Pape
(74) Attorney, Agent, or Firm—Oldham & Oldham Co., L.P.A.

(57) ABSTRACT

For a truck trailer bed or a truck cargo enclosure including one or more compartmented, hollow floor sections, a reinforcement system is provided. The system makes use of strip-like metal inserts which are introduced into selected compartments of the flooring sections that lie beneath a relatively compact, heavy object such as a coil of flat-rolled steel or like cargo. The inserts preferably will be fabricated from the same metallic substance as the flooring sections and will be of a transverse cross section that is identical to the compartments provided in the flooring sections. Having such a cross section, the inserts will fill the selected flooring section compartments and increase the rigidity and resistance of the compartments to damage caused by the concentrated object loading thereon.

19 Claims, 6 Drawing Sheets

FLOOR REINFORCEMENT SYSTEM FOR TRAILER ASSEMBLY

FIELD OF THE INVENTION

The present invention relates generally to a truck trailer of the type normally used to transport heavy cargo and, more particularly, to flat bed trailers employed to carry smaller, very heavy objects such as coils of flat-rolled steel and the like.

BACKGROUND OF THE INVENTION

Included among known flat bed trailer structures is one formed of extruded and/or fabricated aluminum shapes including I-beams and tubular members of generally rectangular cross section. The I-beams and tubular members are assembled by providing shaped apertures in the web portions of the I-beams in closely spaced relation to their upper transversely disposed portions, positioning the tubular members through the apertures, welding oppositely disposed sections of the tubular members to the portions of the web of the I-beams defining the sides of the apertures therein, positioning aluminum flooring sections of an overall height the same as that of the horizontal portions of the I-beams on the tubular members together with outside rails secured to the ends of the tubular members and completing the longitudinal edges of the flooring. The flooring members and outside rails are secured to the tubular structure by welding to complete the structure. A structure such as the one just described in general terms is more fully disclosed in U.S. Pat. No. 4,564,233.

Upon review of U.S. Pat. No. 4,564,233, it will be noted that the flooring sections are positioned between and extend longitudinally along the upper transversely disposed portions of the I-beams, and the flooring sections have a transverse cross section that is made up of a plurality of compartmented, hollow cells that are arranged side-by-side. The compartmented, hollow cross section serves to reduce the overall weight of the trailer structure and, for a variety of types of heavy cargo, to provide a strong and durable supporting surface. A variation of the compartmented cross section disclosed in U.S. Pat. No. 4,564,233 is also known wherein the cells that make up the flooring section are fully enclosed on all sides by elements of the flooring section; however, the cells have a triangular cross section. (See FIG. 4 in the drawings.) Still further variations on these two floor sections are also known where the cells that comprise the sections are not fully enclosed on all sides. Rather, the sections are at least partially open on their bottom side and have members at the base of the cell walls, which allow the floor section to rest upon a subfloor structure positioned immediately thereunder. The subfloor structure, being so positioned, thereby provides a surface for closing off the open side of the floor section cells. (For a better understanding of the features of these open-celled flooring sections, see FIGS. 5 and 6 in the drawings.) Unfortunately, all of the above noted flooring sections have proven to be less than suitable when a need has arisen to transport relatively small, very heavy objects such as one or more coils of flat-rolled steel or perhaps massive, leg-supported machinery where a significant portion of the machinery's weight is concentrated at a relatively small area immediately under the leg(s). In the case of the objects mentioned, and others like them, permanent deformity of the floor section immediately beneath the objects has been known to occur when the concentrated load bearing down on the upper surface of the floor section causes bending and/or buckling of the hollow compartment walls.

The present invention is aimed at fortifying compartmented, hollow floor sections and eliminating the previously experienced permanent deformity. Floor fortification can be provided by the present invention in a localized manner and on an as-needed basis.

SUMMARY OF THE INVENTION

With respect to a truck trailer bed including one or more compartmented, hollow floor sections, the present invention makes use of slender metal inserts which are introduced into selected compartments of the flooring sections that will lie immediately beneath a coil of flatrolled steel or a like object. The inserts preferably will be fabricated from the same metallic substance as the flooring sections and will be of a transverse cross section that is identical to the compartments provided in the flooring sections. Having such a cross section, the inserts will fill the selected flooring section compartments and increase the rigidity and resistance of those compartments to deformation caused by the concentrated object loading thereon.

DETAILED DESCRIPTION OF THE PREFERRED EMBODIMENT

Figure 1:
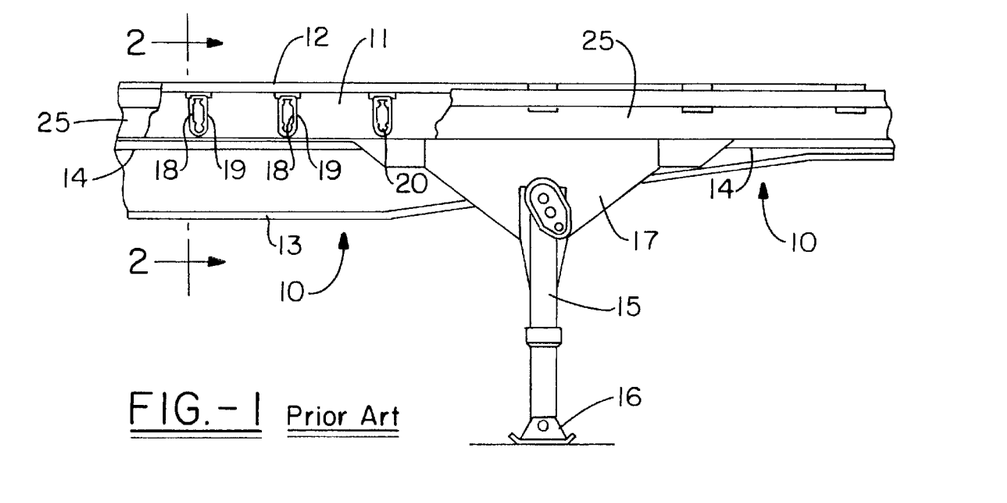
FIG. 1 is a side elevation of a portion of a known flat bed trailer.

By referring to the drawings and FIG. 1 in particular, it will be seen that a known flat bed trailer structure is disclosed which is preferably formed of aluminum extruded and fabricated sections. The portion of the flat bed trailer seen in FIG. 1 comprises a portion inwardly of the front end thereof. The trailer structure is formed of a pair of longitudinally disposed I-beams 10 comprising web portions 11 with upper and lower horizontally disposed flanges or chords 12 and 13 respectively. The I-beams 10 are each formed of a pair of T-shaped extrusions welded to one another longitudinally on a weld line 14. The forward portion of the flat bed trailer has the I-beams 10 of reduced height by forming one of the web portions 11 in a tapered shape below the weld line 14. A retractable double leg support 15 having pivoted ground engaging shoes 16 is attached to the forward portion of the flat bed trailer by semi-triangular mounting brackets 17 which are secured to several of a plurality of transversely positioned tubular frame members 18 which are located in longitudinally spaced transversely registering apertures 19 in the upper portions of the webs 11 of the longitudinally extending I-beams 10 as illustrated in FIGS. 1 and 2 of the drawings.

By referring to FIG. 1 of the drawings, it will be seen that three of the tubular frame members 18 are shown double welded in three of the apertures 19, a portion of an outside rail 25 being broken away. Each of the tubular frame members 18 are double welded in position in each of the pairs of transversely registering apertures 19 formed in the upper portions of the webs 11 of the I-beams 10. Each of the opposite spaced vertical side walls of the tubular frame member 18 are welded by fillet welds to the portions of the I-beam web 11 defining the vertical walls of the aperture 19 therein so as to result in double welds joining the side walls of the tubular frame members 18 to the I-beams 10. The lower portion of the aperture 19 is cross sectionally curved in a half circular shape matching that of the bottom portion 20 of the tubular frame members 18 which fit snugly therein.

Figure 2:
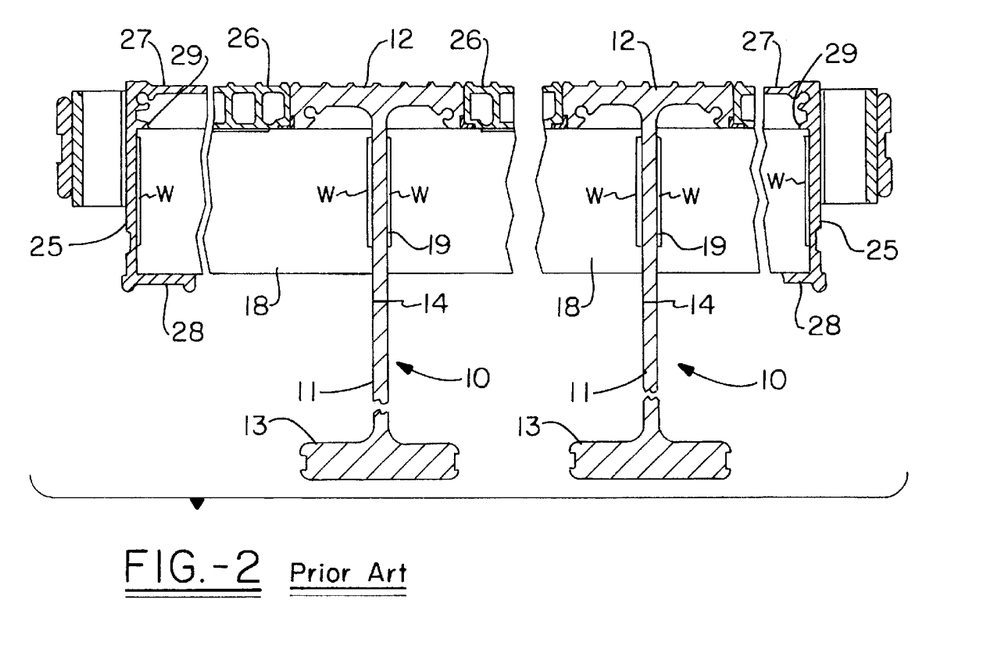
FIG. 2 is a vertical section in enlarged detail on the line 2—2 of FIG. 1.

By referring now to FIG. 2 of the drawings, a transverse section, on an enlarged scale, through the flat bed trailer may be seen and by referring thereto one of the transversely positioned tubular frame members 18 will be seen double welded in the apertures 19 in the webs 11 of the I-beams 10. It will also be see that the upper transversely disposed portions 12 of the I-beams 10 form a portion of the floor of the flat bed trailer. Several longitudinal extending compartmented hollow flooring sections 26 are positioned longitudinally of the flat bed trailer in abutting parallel relation with the upper transversely disposed portions 12 of the I-beams 10. The flooring sections 26 are welded to each of the transversely positioned tubular frame members 18 which support the same.

The outside rail 25 has vertically spaced inwardly extending right angular sections 27 and 28 on its upper and lower edges and an in-turned flange 29 spaced with respect to the upper flange 27. The ends of each of the transversely positioned tubular frame members 18 abut the inner surface of the outside rails 25 and are welded thereto and the in-turned longitudinally extending rib 29 rests on the upper straight top portion of each of the transversely positioned tubular frame members 18 and thereby spaces the in-turned flange 27 thereabove on the same level as the upper surfaces of the flooring sections 26 and the upper surfaces of the transversely disposed portions 12 of the I-beams 10.

The known flat bed trailer structure disclosed herein is formed of aluminum extrusions welded to one another in the finished flat bed trailer assembly and the spaced longitudinally extending I-beams 10 are fabricated from two such aluminum extrusions, each of which is T-shaped and which extrusions are arranged with one upright and one inverted and joined together by welding them continuously to one another on the weld line 14 hereinbefore referred to. The assembly of the I-beams from the two T-shaped aluminum extrusion enables the plurality of apertures 19 in each of the web portions 11 of the I-beams 10 to be stamped therein with a controlled size and configuration which insures the accurate and desirable positioning of the transversely positioned tubular frame members 18 where they may be easily and efficiently double welded and serve not only to cross brace the I-beams 10, but provide continuous side to side supporting structure for the flooring of the flat bed trailer structure.

Figure 3:
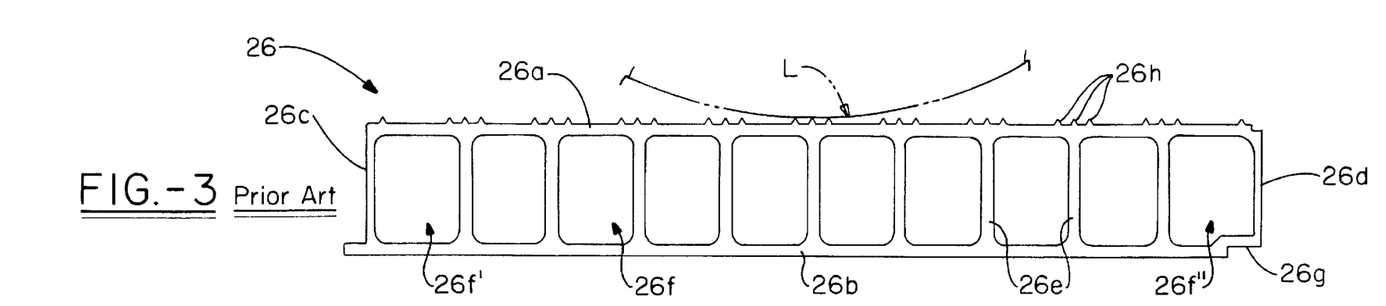
FIG. 3 is a vertical section in further enlarged detail of the flooring section shown in FIG. 2.

By referring to FIG. 3 of the drawings, a further enlarged vertical end view of one of the flooring sections 26 may be seen. It will be noted from FIG. 3 that the flooring structure 26 is comprised generally of a top wall 26a, a bottom wall 26b, a first vertical end or side wall 26c, a second vertical end or side wall 26d and a plurality of transversely spaced, vertically extending intermediate walls 26e that, along with top and bottom walls 26a and 26b and end or side walls 26c and 26d define a plurality of hollow compartments indicated generally by the reference numeral 26f. The hollow compartments 26f extend longitudinally along the entire length of the flooring section 26 and have a cross section that for the most part is rectangular. By referring to FIG. 3 it will be seen that not all of the hollow compartments 26f have cross sections that are identical. A first hollow end compartment 26f' bounded in part by the end or side wall 26c, while having a height that is the same the other compartments 26f, has a width that is slightly greater than the width of most of the other compartments 26f. Additionally, a second hollow end compartment 26f" bounded in part by the end or side wall 26d, has a width that is substantially the same as the compartment 26f'; however, the lower outside corner is notched in conformity with a raised channel 26g provided in bottom wall 26b. The cross-sectional differences noted among the compartments 26f, 26f' and 26f" are the result of trailer component design and/or assembly considerations for the particular trailer structure described herein and such differences may not necessarily be encountered in the case of other known trailer structures making use of flooring sections similar in construction to the floor section 26.

Figure 4:
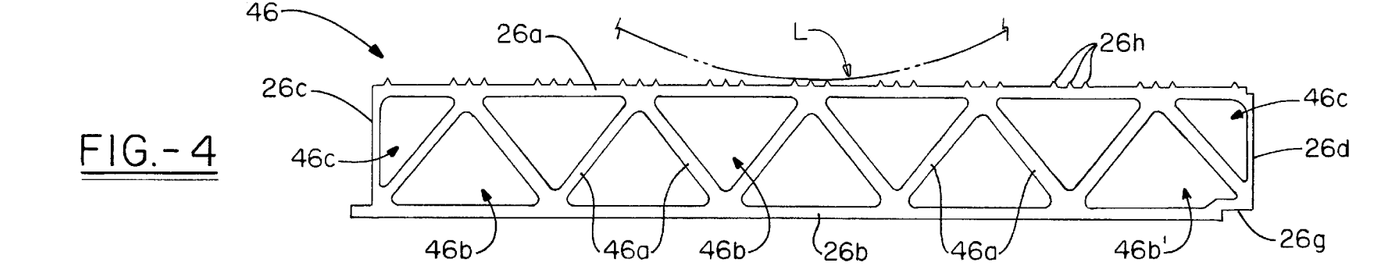
FIG. 4 is a vertical section in enlarged detail of another known flooring section which varies from that shown in FIG. 3 largely for its triangular-shaped cell cross section.

The concept of the present invention is not necessarily intended to be limited only to the flooring section 26, but can be applied in any case of a trailer structure where flooring sections having compartmented, hollow cells are employed. Some exemplary flooring sections are provided in FIGS. 4, 5 and 6 of the drawings. The flooring section shown in FIG. 4 and generally identified by the reference numeral 46 is similar in a number of respects to the section depicted in FIG. 3. Flooring section 46 has top wall 26a, bottom wall 26b, first vertical end wall 26c, second vertical end wall 26d and raised corner channel 26g. Instead of having transversely spaced, vertically extending intermediate walls 26e as shown in FIG. 3, the flooring section 46 has a plurality of inclined walls 46a which alternate in their direction of inclination as shown in FIG. 4 and which thereby define a plurality of generally triangular hollow compartments indicated by the reference numerals 46b, 46b' and 46c. Just as in the case of the hollow compartments 26f, 26f' and 26f" of the flooring section 26, the compartments 46b, 46b' and 46c extend longitudinally along the entire length of flooring section 46.

Figure 5:
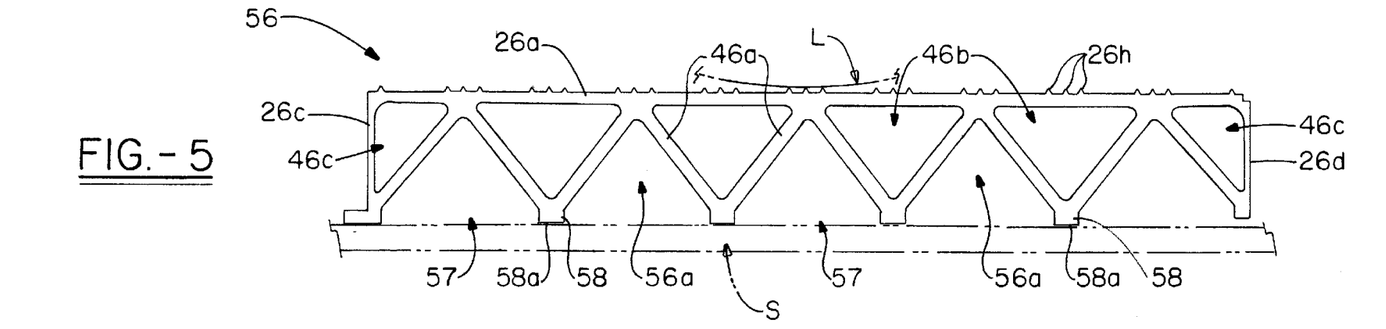
FIG. 5 is a vertical section in enlarged detail of a known flooring section which has an open-bottom cell construction.

The flooring section illustrated in FIG. 5 and identified overall by the reference numeral 56 is substantially the same as the flooring section 46 except bottom wall 26b is absent from flooring section 56 with the result that a plurality of cells 56a is formed. As will be observed by reference to FIG. 5, each of the cells 56a has an opening 57 that extends along the length of the underside of the floor section 56. Between each of the cells 56a, there is provided a rib-like foot element 58 that serves to join the lower ends of the inclined walls 46a and to provide a horizontal flat surface 58a that extends along the length of floor section 56. In use the, the floor section 56 will be laid upon a subjacent horizontal surface indicated by the letter "S" and the straight, dashed outline in FIG. 5. The surface "S" may be part of a flat bed trailer structure or it may be the bottom of a cargo enclosure such as that found in a traditional non-trailer delivery truck or a van. Surface "S", regardless of whether it is part of a trailer structure or is the bottom of a cargo enclosure, makes contact with the horizontal surfaces 58a and thus provides a means for closing off the bottom side of the cells 56a. As will hereafter be illustrated, such closure of the cells 56a permits use of the floor reinforcement system of the present invention.

Figures 6, 7, 8:
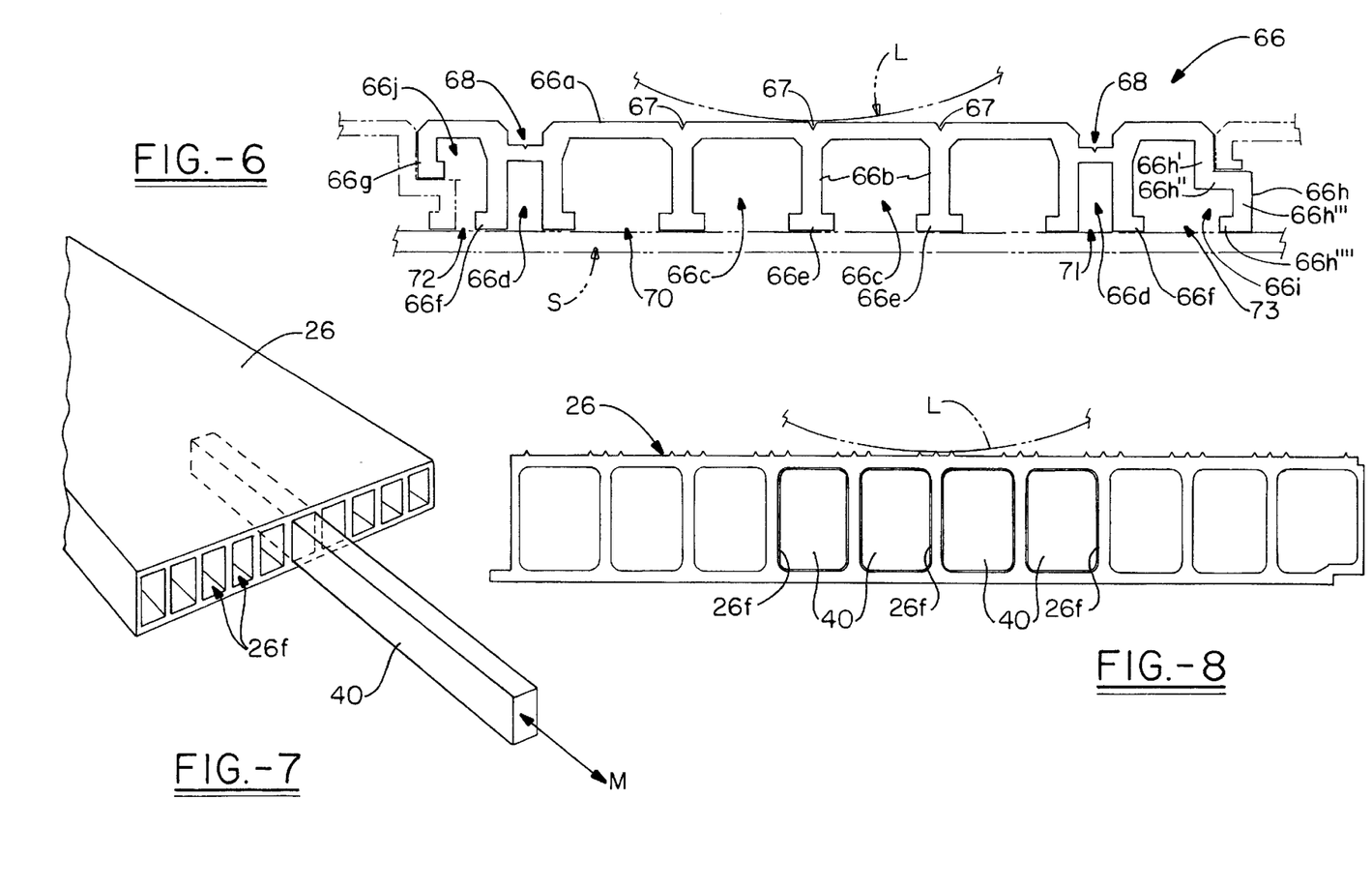
FIG. 6 is a vertical section in enlarged detail of another known flooring section which also has an open-bottom cell construction.
FIG. 7 is a perspective view showing a flooring section like that of FIG. 3 and a strip-like insert of the reinforcement system of the present invention as the insert is partially introduced into the flooring section.
FIG. 8 is a vertical section of the flooring section shown in FIG. 3, showing a plurality of strip-like inserts of the reinforcement system of the present invention having been introduced therein.

FIG. 6 shows yet another flooring section with which the present invention may used. The flooring section, which is designated generally by the reference numeral 66, has a top wall 66a. Unlike the top wall 26a of the flooring sections 26, 46 and 56 already described, the wall 66a is provided on its top surface with a plurality of longitudinally extending, transversely spaced grooves 67 which are situated generally in the central region of wall 66a. The top surface of wall 66a is further provided with longitudinal channels 68 which are positioned outwardly from the grooves 67 and inwardly from the outer lateral extremities 66g and 66h of the flooring section 66. The flooring section 66 is further provided with a plurality of transversely spaced, vertically extending intermediate walls 66b that project downwardly from the top wall 66a to define a number of laterally adjacent cells. The flooring section 66 has basically two types of cells which are defined by the walls 66b: (I) the cells 66c which are generally situated in the central region of the section 66 and inboard of the longitudinal channels 68 and the cells 66d which are located beneath the channels 68. At the lower end of each of the walls 66b, rib-like foot elements 66e and 66f are provided. As may be observed by referring to FIG. 6, the foot elements 66e and 66f have somewhat different cross sections (and the elements 66f may differ in their directional orientation relative to one another); however, the elements 66e and 66f function similarly to the foot elements 58 of flooring section 56, as shown in FIG. 5. The flooring section 66 has opposing side members 66g and 66h which complete the structure of the section 66. Side member 66g resembles an L-shaped flange that extends downwardly from the top wall 66a at one of its ends and then inwardly toward the nearest of the vertically extending intermediate walls 66b. Side member 66h is comprised of a number of vertically and horizontally extending portions. From the top wall 66a, a first vertical portion 66h' extends downwardly toward and intersects with a first horizontal portion 66". The first horizontal portion 66h" then extends outwardly from the first vertical portion 66' and joins to a second vertical portion 66h'". The second vertical portion 66h'" extends downwardly from the first horizontal portion 66h" and joins a second horizontal portion 66h"" which extends inwardly toward the nearest of the vertically extending intermediate wall 66b. The side members 66g and 66h as thus described define cells 66j and 66i respectively. The cells 66c, 66d, 66j and 66h have openings 70, 71, 72 and 73 respectively, which when the floor section 66 is placed on the subjacent horizontal surface "S" are become closed off in a fashion similar to that described above for the floor section 56. Such closure of the cells 66c, 66d, 66j and 66h will also allow use of the floor reinforcement system of the present invention in a manner as will be hereinafter illustrated.

Returning now to FIG. 3 and the flooring section 26 depicted therein, the outer surface of the top wall 26a of the flooring section 26 is provided with a plurality of upwardly projecting ribs 26h. The ribs 26h run longitudinally along the length of the flooring section 26, and generally are evenly spaced transversely along the outer surface of the top wall 26a in groups of three. As will also be seen in FIG. 3, an object such as a heavy coil of flat-rolled steel is represented by the letter "L" and the curved, dashed outline and is shown to be resting on the top wall 26a of the flooring section 26. Resting in such manner, the full weight of the coil L will be concentrated in a relatively small area on the top wall 26a, defined generally by the width of the coil L taken along its longitudinal axis and the amount of linear contact made between the coil L and the top wall 26a, such contact being measured transversely along wall 26a. In past instances where the overall weight of the coil L was sufficiently large to exceed the bending and buckling resistance of the portion of the flooring section 26 lying immediately thereunder, permanent deformation or damage manifested in a form of crushing the portion of flooring section 26 underlying coil L has occurred, with one or more of the overly stressed compartment walls 26 perhaps becoming buckled or otherwise bent from their normal vertical orientation and with top wall 26a becoming bowed downward. (Permanent deformation of a similar nature can occur in other hollow compartment flooring sections including those shown in FIGS. 4, 5, and 6 of the drawings and described hereinabove.)

The various aspects of the reinforcement system of the present invention, which is directed toward eliminating permanent deformation or damage like that discussed above, are illustrated for the flooring section 26 collectively in FIGS. 7, 8, 9A, 9B and 9C. (Aspects of the invention as they relate to exemplary flooring systems 46, 56 and 66 are similarly illustrated in FIGS. 10, 11, 12A, 12B, 12C, 13, 14, 15A, 15B, 15C, 16, 17, 18A, 18B, 18C and 18D.) By referring to FIG. 7 of the drawings, a perspective view of a flooring section 26 along with a reinforcement member 40 of the present invention may be seen. It will be observed that the reinforcement member 40 is a bar-like structure that will be slidably introduced into any one or more of the hollow compartments 26f before an object such as the coil L is placed on the flooring section 26. As indicated in FIG. 7 by the arrow identified with the letter "M", the reinforcement member 40 will be movable into and out of the flooring section 26 in a longitudinal direction. Preferably the member 40 will have a length that corresponds to that of the compartment 26f into which it is introduced, and the member 40,when in use, will be fully inserted into the compartment 26f. By referring to FIG. 8, it will be seen that the reinforcement system of the present invention is envisioned to include a plurality reinforcement members 40 that are introduced into compartments 26f that will be situated immediately beneath the coil L and into any desired number of contiguous compartments lying to the left and right thereof. In instances where the mass and/or size of the coil L may so dictate, as many as all of the compartments 26f, 26f' and 26f" of a flooring section 26 may receive one of the reinforcement members 40, and additionally, more than one of the flooring sections 26 situated proximately to each other may contain reinforcement members 40.

Figure 9A:
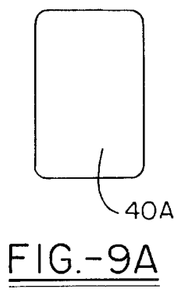
FIG. 9A provides an end view of an a strip-like insert of the present invention, usable with the flooring section shown in FIG. 3.
Figure 9B:
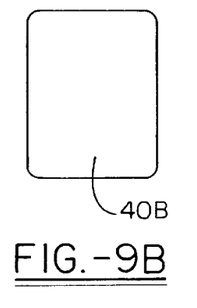
FIG. 9B provides an end view of another strip-like insert of the present invention, usable with the flooring section shown in FIG. 3.
Figure 9C:
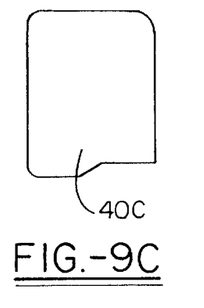
FIG. 9C provides an end view of yet another strip-like insert of the present invention, usable with the flooring section shown in FIG. 3.

By referring to FIGS. 9A, 9B and 9C where end views are provided of reinforcement members usable with the flooring section 26, it will be seen in FIG. 9A that a reinforcement member 40A insertable specifically into the compartments 26f has a cross section that is identical to that of each of the compartments 26f and that will dimensionally allow the member 40A to slide freely into and out of the compartments 26f and at the same time make contact with all four of the walls of the compartments 26f. Similarly in FIGS. 9B and 9C, reinforcement members 40B and 40C will be seen, which are insertable specifically into the compartments 26f' and 26f", respectively Just as in the case of the member 40A, the cross sections of members 40B and 40C will be the same as those corresponding respectively to compartments 26f' and 26f" and will also permit free sliding movement to occur and full contact will all walls of compartments 26f' and 26f" to be achieved.

Figure 10:
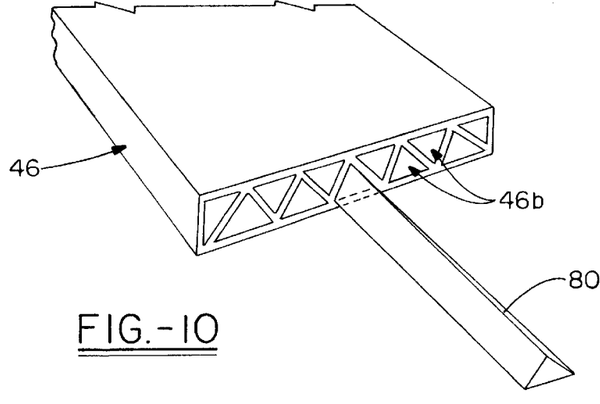
FIG. 10 is a perspective view showing a flooring section like that of FIG. 4 and a strip-like insert of the reinforcement system of the present invention as the insert is partially introduced into the flooring section.
Figure 11:
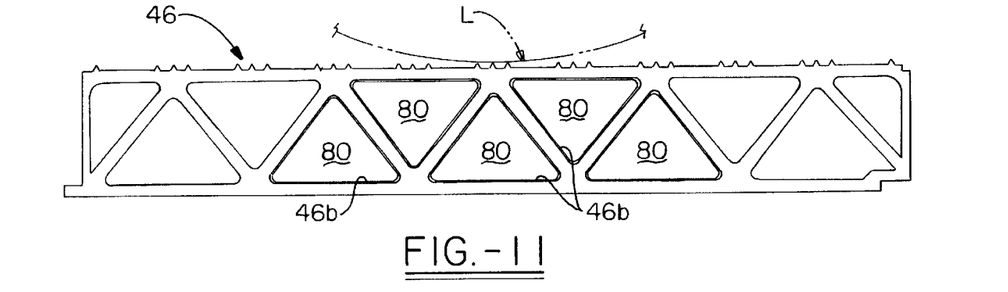
FIG. 11 is a vertical section of the flooring section shown in FIG. 4, showing a plurality of strip-like inserts of the reinforcement system of the present invention having been introduced therein.
Figure 12A:
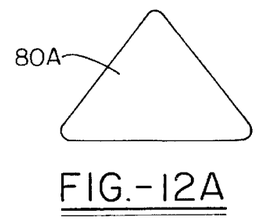
FIG. 12A provides an end view of an a strip-like insert of the present invention, usable with the flooring section shown in FIG. 4.
Figure 12B:
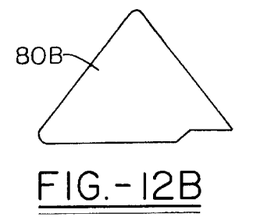
FIG. 12B provides an end view of another strip-like insert of the present invention, usable with the flooring section shown in FIG. 4.
Figure 12C:
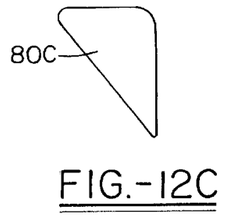
FIG. 12C provides an end view of yet another strip-like insert of the present invention, usable with the flooring section shown in FIG. 4.
Figures 13, 14:
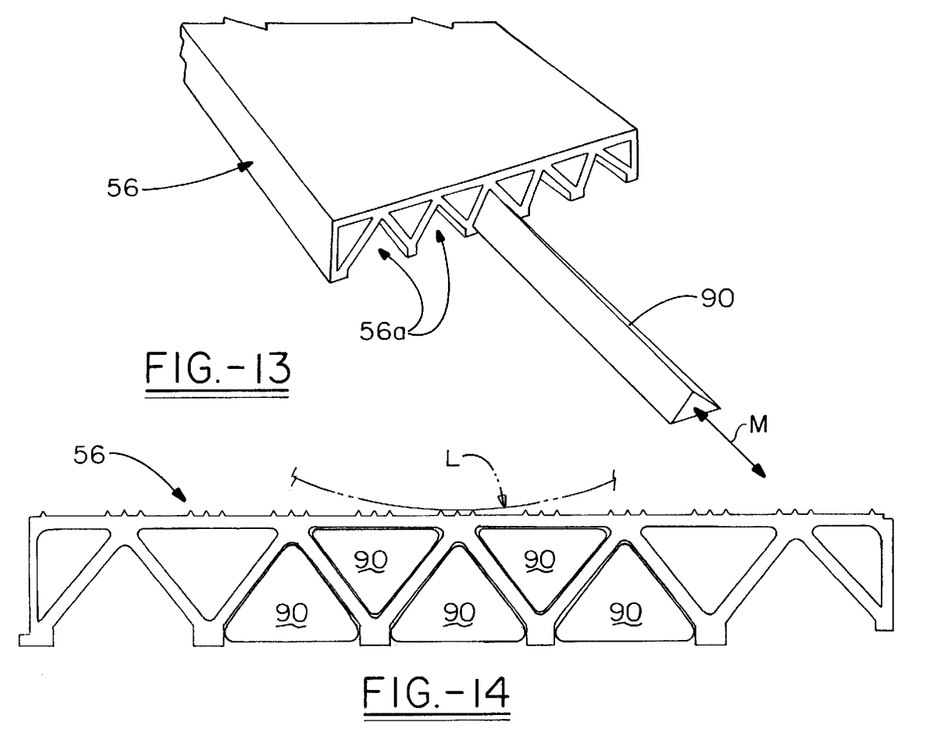
FIG. 13 is a perspective view showing a flooring section like that of FIG. 5 and a strip-like insert of the reinforcement system of the present invention as the insert is partially introduced into the flooring section.
FIG. 14 is a vertical section of the flooring section shown in FIG. 5, showing a plurality of strip-like inserts of the reinforcement system of the present invention having been introduced therein.
Figure 15A:
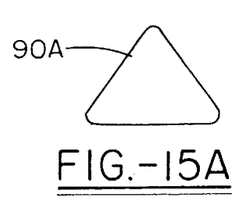
FIG. 15A provides an end view of an a strip-like insert of the present invention, usable with the flooring section shown in FIG. 5.
Figure 15B:
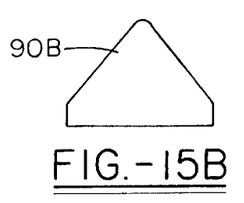
FIG. 15B provides an end view of another strip-like insert of the present invention, usable with the flooring section shown in FIG. 5.
Figure 15C:
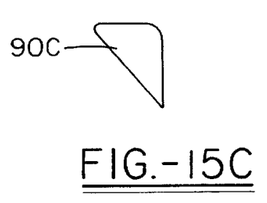
FIG. 15C provides an end view of yet another strip-like insert of the present invention, usable with the flooring section shown in FIG. 5.
Figure 16:
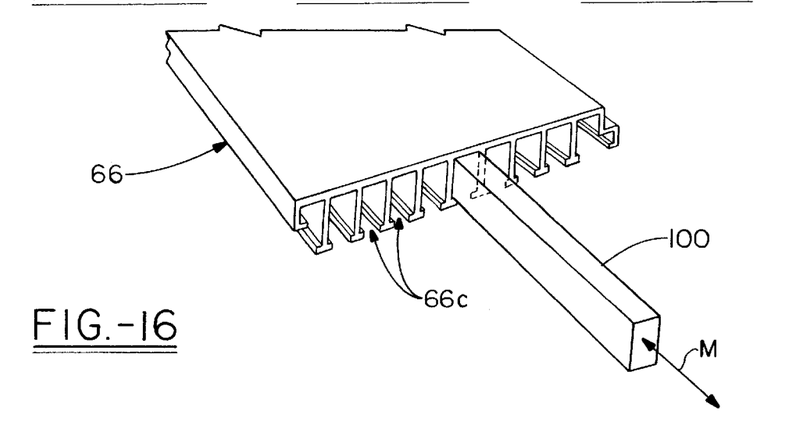
FIG. 16 is a perspective view showing a flooring section like that of FIG. 6 and a strip-like insert of the reinforcement system of the present invention as the insert is partially introduced into the flooring section.
Figure 17:
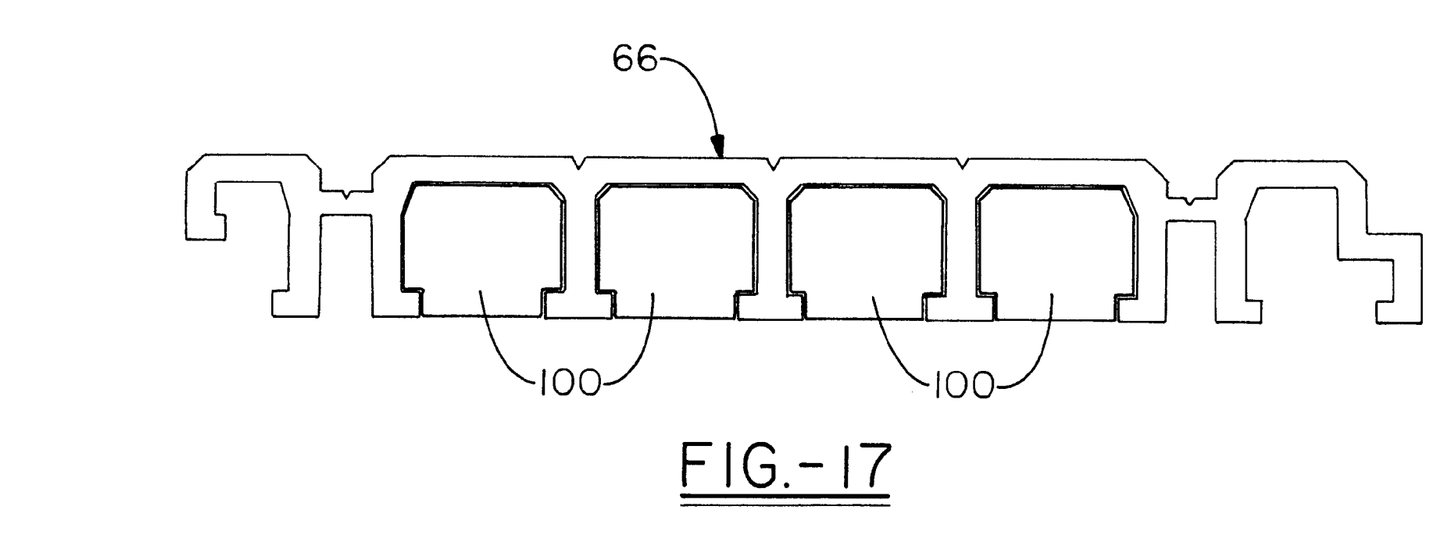
FIG. 17 is a vertical section of the flooring section shown in FIG. 6, showing a plurality of strip-like inserts of the reinforcement system of the present invention having been introduced therein.
Figure 18A:
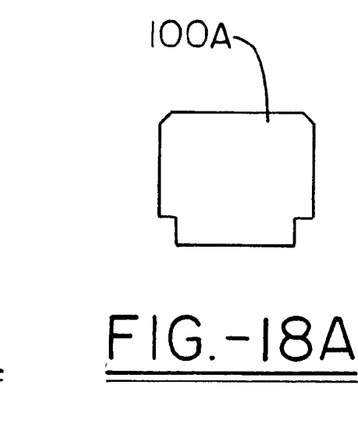
FIG. 18A provides an end view of an a strip-like insert of the present invention, usable with the flooring section shown in FIG. 6.
Figure 18B:
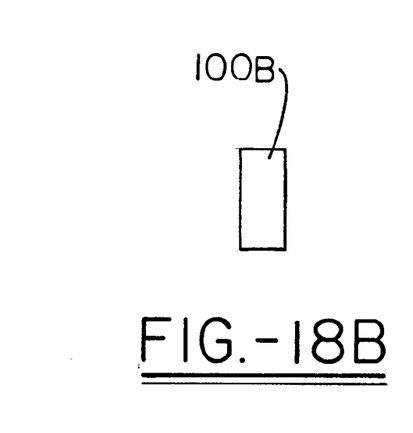
FIG. 18B provides an end view of another strip-like insert of the present invention, usable with the flooring section shown in FIG. 6.
Figure 18C:
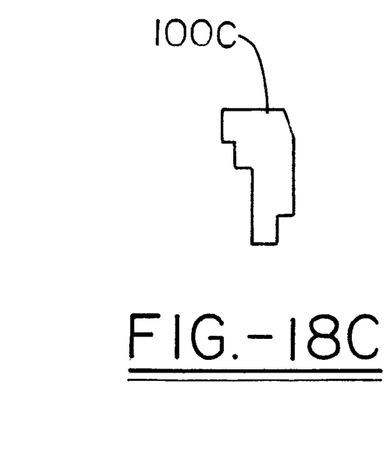
FIG. 18C provides an end view of yet another strip-like insert of the present invention, usable with the flooring section shown in FIG. 6.
Figure 18D:
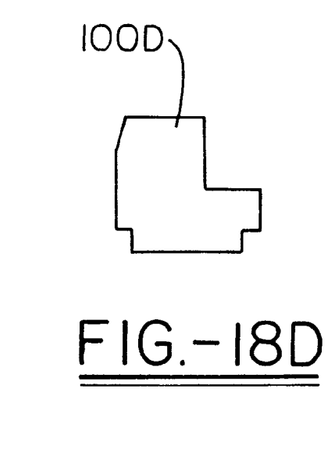
FIG. 18D provides an end view of still yet another strip-like insert of the present invention, usable with the flooring section shown in FIG. 6.

The reinforcement of the present invention is used in a similar manner for the flooring sections 46, 56 and 66 shown in FIGS. 4, 5 and 6 of the drawings. FIGS. 10, 13 and 15, provide a perspective view of each of the flooring section 46, 56 and 66 along with the reinforcement members 80, 90 and 100 of the present invention. In the case of the flooring section 46, it will be observed that the reinforcement member 80 is a bar-like structure having a triangular cross section that will allow the member 80 to be slidably introduced into any one or more of the hollow compartments 46b. Likewise in the case of the flooring sections 56 and 66, the reinforcement members 90 and 100 are bar-like structures having cross sections corresponding to those of the cells 56a and 66c and thus the members 90 and 100 are slidably introduced in to any one or more or the cells which have a corresponding shape. FIGS. 11, 14 and 16 show a plurality of the reinforcement members 80, 90 and 100 as they will appear after having been introduced into the compartments 46b, 56a and 66c lying immediately beneath the coil "L" and into contiguous compartments lying to the left and right thereof. It will be noted that when members 80, 90 and 100 are utilized in such manner, they provide support and reinforcement to flooring sections 46, 56 and 66 in the same way as members 40 support and reinforce flooring section 26.

FIGS. 12A, 12B, 12C, 15A, 15B, 15C, 18A, 18B and 18C provide cross-sectional end views of the reinforcement members which may be used with the flooring sections 46, 56 and 66 in any situation where it is necessary or desirable to reinforce all of the cells in any one of the flooring sections 46, 56 and 66. It will be noted that just as in the case of the flooring section 26, the reinforcement members for the flooring sections 46, 56 and 66 are provided with cross-sections that correspond to those of all cells present in the flooring sections with which they are used.

For the reinforcement system of the present invention, it is envisioned that the plurality of reinforcement members 40, 80, 90 and 100 will be fabricated from a metal that preferably is the same as that used to fabricate the flooring sections 26, 46,56 and 66. In the case of the known trailer structure described hereinabove, the flooring sections 26, 46, 56 and 66 are fabricated of aluminum. Therefore, the plurality of reinforcement members 40, 80, 90 and 100 will likewise be fabricated of aluminum through the use of any suitable known fabrication technique. Other trailer structures may exist or come into use where metals other than aluminum are employed to make the flooring sections 26, 46, 56 and 66, or compartmented, hollow flooring sections similar thereto. Where such other metals are used for the flooring sections 26, 46 56 and 66, or similar flooring systems, the plurality of reinforcing members 40, 80, 90 and 100 used therewith preferably will be of a like metal, and all reinforcement systems such as that described herein and fabricated of metals other than aluminum are intended to be within the scope of the present invention.

While the preferred embodiment of the invention has been described above, it will be recognized and understood that various modifications may be made therein and the appended claims are intended to cover all such modifications which may fall within the spirit and scope of the invention.

What is claimed is:

1. A floor reinforcement system for use with a compartmented, hollow flooring section in a truck trailer structure comprising a plurality of elongated reinforcement members selectively insertable into a plurality of cells included in said flooring section, said plurality of cells being defined by at least a horizontal top wall, a first end wall, a second end wall and a plurality of intermediate walls, said intermediate walls being transversely spaced between said first and second end walls, wherein said flooring section is laid upon a subjacent horizontal surface of said trailer structure so that said subjacent horizontal surface serves as a means for closing an opening on the bottom side of each cell comprising said plurality of cells.

2. The floor reinforcement system as recited in claim 1, wherein said plurality of reinforcement members are made of aluminum.

3. The floor reinforcement system as recited in claim 1, wherein said flooring section is made, at least in part, of aluminum.

4. The floor reinforcement system as recited in claim 1, wherein said plurality of compartmented hollow cells are oriented longitudinally along the length of said trailer.

5. A floor system for use in a truck trailer structure comprising:
   at least one floor section comprising a plurality of compartmented hollow cells,
   at least one elongated reinforcement member selectively insertable at least one corresponding hollow cell in said at least one floor section and positioned at a predetermined location within at least one cell, wherein said at least one elongated reinforcement member increases the strength and rigidity of said compartmented flooring section at said predetermined location.

6. The floor system as recited in claim 5, wherein each of said hollow cells in said compartmented flooring section are completely enclosed along a longitudinal length thereof and open on at least one end thereof to allow for insertion of said at least one elongated reinforcement member.

7. The floor system as recited in claim 5, wherein said at least one floor section is defined by a horizontal top wall, a first end wall, a second end wall, and a plurality of intermediate walls, said intermediate walls being transversely spaced between said first and second end walls and creating said plurality of cells.

8. The floor system as recited in claim 5, wherein each of said reinforcement members has a transverse cross-section substantially corresponding to a transverse cross-section a corresponding hollow cell of said floor section.

9. The floor system as recited in claim 8, wherein said transverse cross-section of said reinforcement members and said transverse cross-section of said corresponding hollow cells are generally triangular.

10. The floor system as recited in claim 8, wherein said transverse cross-section of said reinforcement members and said transverse cross-section of said corresponding hollow cells are generally rectangular.

11. The floor system as recited in claim 5, wherein said at least one reinforcement member is selectively fixed at said predetermined location.

12. A floor reinforcement system for a vehicle comprising:
   a compartmented flooring section comprising one or more compartmented hollow cells;
   at least one reinforcement member selectively insertable into said one or more compartmented hollow cells;
   wherein said at least one reinforcement member comprises a transverse cross-section that is generally shaped to correspond to the transverse cross-section of a corresponding cell of said one or more compartmented hollow cells;
   wherein said at least one reinforcement member provides means to increase the strength and rigidity of at least a portion of said flooring section.

13. The floor reinforcement system as recited in claim 12, wherein said compartmented flooring section is defined by a horizontal top wall, a first end wall, a second end wall, and a plurality of intermediate walls, said plurality intermediate walls being transversely spaced between said first and second end walls.

14. The floor reinforcement system as recited in claim 12, wherein said transverse cross-section of said reinforcement members and said transverse cross-section of said corresponding hollow cells are generally triangular.

15. The floor reinforcement system as recited in claim 12, wherein said transverse cross-section of said reinforcement members and said transverse cross-section of said corresponding hollow cells are generally rectangular.

16. The floor reinforcement system as recited in claim 12, wherein said reinforcement member is made of aluminum.

17. The floor reinforcement system as recited in claim 12, wherein said flooring section is made, at least in part, of aluminum.

18. The floor reinforcement system as recited in claim 12, wherein said vehicle is a trailer and said one or more compartmented hollow cells are oriented longitudinally along the length of said trailer.

19. The floor reinforcement system as recited in claim 12, wherein said floor section is generally rectangular and said compartmented hollow cells are oriented longitudinally with respect to said rectangular floor section.

* * * * *